April 28, 1931.  W. H. SAUVAGE  1,802,673
REGULATOR FOR BRAKE RIGGING
Original Filed Feb. 9, 1925
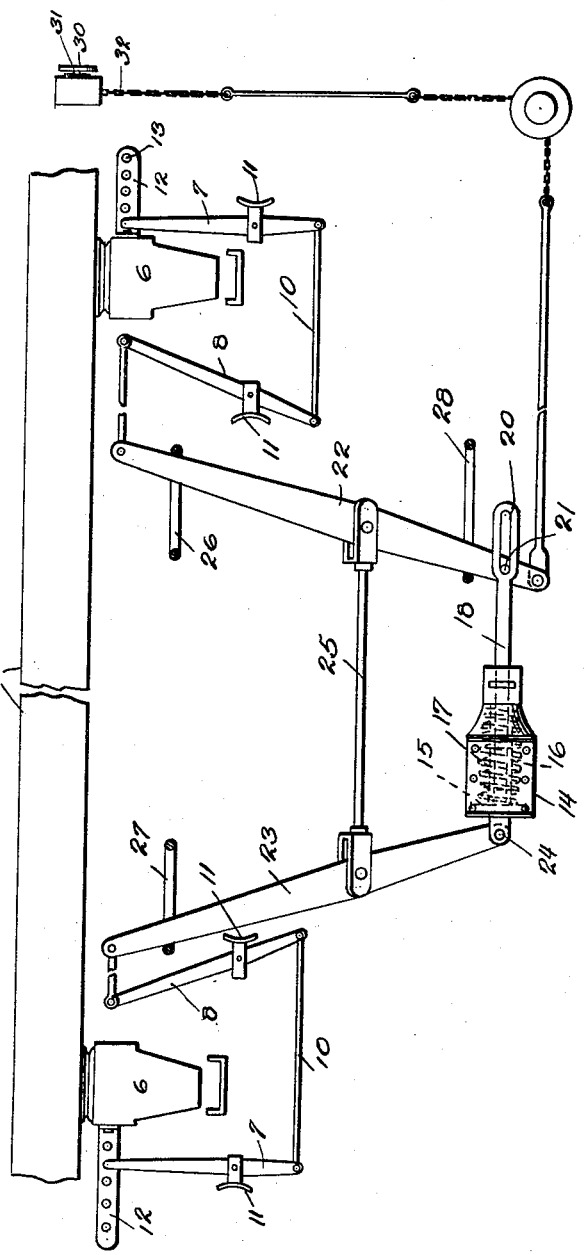
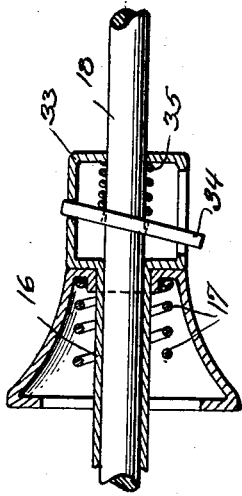
INVENTOR.
W. H. Sauvage
BY
ATTORNEYS Patented Apr. 28, 1931

1,802,673

UNITED STATES PATENT OFFICE

WILLIAM H. SAUVAGE, OF NEW YORK, N. Y., ASSIGNOR, BY MESNE ASSIGNMENTS, TO ROYAL RAILWAY IMPROVEMENTS CORPORATION, OF NEW YORK, N. Y., A CORPORATION OF DELAWARE

REGULATOR FOR BRAKE RIGGING

Original application filed February 9, 1925, Serial No. 7,960. Divided and this application filed March 20, 1928. Serial No. 263,065.

This invention relates to improvements in foundation brake rigging and more particularly to the general type of rigging shown in my co-pending application, Serial No. 7,960, filed February 9, 1925, resulting in Patent No. 1,753,133 on April 1, 1930, for improvements in hand brakes, the present application being a division thereof.

One of the objects of the present invention is to provide an improved foundation brake rigging and associated parts so supported, positioned and arranged as to permit of a primary manual adjustment of the truck brake riggings of either or both trucks to approximate proper brake shoe clearance as and when desired without disturbing the angularity of the remaining parts of the brake rigging.

Another object is to provide a mechanism of the above general character adapted to obtain substantially proper brake shoe clearance or manually to regulate the truck brake rigging to approximate proper brake shoe clearance.

A further object is to provide a mechanism of the above general character whereby substantially uniform piston travel is obtained at all times.

A further object is to provide a mechanism of the above general character, in which present standard equipment is utilized throughout, but rearranged in predetermined relation whereby the objects above set forth may be accomplished at minimum expense.

Other objects will be in part obvious from the annexed drawings and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as part of this disclosure, and in such drawings, like characters of reference denote corresponding parts throughout all of the views, in which—

Fig. 1 is a diagrammatic view partly in plan and partly in elevation showing the essential parts of the entire foundation brake rigging and associated hand brake.

Fig. 2 is a detail sectional view of the clutch mechanism associated with the cylinder piston rod.

Referring now to the drawings in detail, and more particularly to Fig. 1, 5 indicates the car body, such as center sills of a railway vehicle of any desired type adapted to support the flooring of the car and in turn this is supported from truck and body bolsters 6 located near each end of the car, for example. These bolsters are merely indicative of the truck parts associated therewith, and each truck is, of course, provided with a dead lever 7 and a live lever 8 connected by means of bottom rod 10. The live and dead levers carry brake shoes 11 adapted to coact with the peripheries of the adjacent wheels assuming there are four wheels to each truck. The upper parts of the dead levers 7 are supported from fulcrums 12 mounted on car body or bolsters 6, each fulcrum being provided with a plurality of holes 13 spaced at any desired intervals, whereby the lever 7 may be connected with any one, thereby to bring the brake shoes into substantially proper brake shoe clearance relative to the wheels. The object of this arrangement will hereinafter be more fully pointed out.

Centrally positioned beneath the car body is a cylinder 14 provided with piston 15 and telescoping hollow piston rod 16 normally held in retracted position by means of spring 17. The cooperating telescopic portion of this piston push rod is indicated at 18, and is provided with a lost motion device such as slotted end 20 cooperating with pins 21 extending from a live cylinder lever 22. Cooperatively associated with this live cylinder is the dead or floating lever 23 which in the present case is pivotally supported at the point 24 at the rear of the cylinder. This point, however, obviously could be any fixed part of the car frame. The cylinder levers are connected by means of a tie rod 25 and are supported in lever guide hangers 26, 27 and 28, which determine the predetermined normal angular relation with respect to the car body, as well as the truck levers and air brake piston when the brakes are in full release position as shown. In this manner, predetermined piston and hand brake travel as well as proper angularity and regulation of the truck brake levers may always be maintained within approximate limits.

As above explained, the cylinder piston push rod is of the telescopic type provided with a lost motion connection with the live cylinder lever whereby the hand brake mechanism, regardless of its type, may be actuated without movement of the piston. The hand brake is preferably of that type illustrated, described and claimed in the parent application above noted, but may comprise broadly a hand wheel 30, mounted upon a shaft 31 provided with any desired type of gearing to exert a pull upon a chain 32, thereby to actuate the cylinder lever 22 and apply the brakes.

It will be noted that in this construction the slot 20 in the piston push rod jaw 18 is proportional or substantially equal to the normal hand brake application movement, and if any excess travel exists, the pin 21 reaches the end of the slot 20 thereby to bodily move the outer or telescoping piston push rod 18 outwardly with respect to the piston 16. This movement is permitted by reason of any desired form of holding means but preferably the type shown in Fig. 2, that is, in the end of the hollow piston 16 is provided a housing 33 containing one or more holding dogs 34 normally held in canted position by means of stiff spring 35. When the hand brake is applied the movement of the cylinder lever and the pin, which passes thru the push rod slotted head, will not move this push rod head forward thru friction owing to the stiff resistance offered by the spring behind the dog. This old and well known construction so frequently employed in this art, permits a free relative outward movement of the piston push rod 18, but prevents relative inward movement thereof with respect to part 16.

Thus, whenever excess travel occurs in the truck brake rigging, the effective length of the piston rod formed by the parts 16 and 18 will be changed to take up this excess travel on application of the hand brakes.

As above pointed out, however, the main feature of the present invention is directed to the foundation brake rigging and the manner in which the truck brake riggings may be regulated to approximate proper brake shoe clearance without disturbing the normal angularity of those parts of the brake rigging not being regulated. For instance, if it is found that with all new brake shoes considerable excess travel exists in the rigging of either truck and the brake shoe clearance is consequently abnormally long, then the pin in upper end of the dead lever 7 is disconnected from its fulcrum 12 and moved towards the end of the car as far as possible, bringing the shoes into engagement with the peripheries of the wheels, whereupon it is then dropped back to the next hole 13 in the fulcrum 12, which permits the shoes to drop clear of the wheels thereby giving approximate proper brake shoe clearance. If these holes are relatively close together or are in staggered relation, for example, then a fairly close and accurate initial adjustment may be obtained with push rod 18 in full release and bottom of piston 16 as shown in dotted lines.

When this manual adjusting movement takes place and the upper end of the dead lever 7 is moved towards the end of the car, it will be noted particularly that the pull exerted thereon is limited by the engagement of the cylinder levers with their respective lever guide stops 26 or 27 according to which truck is being regulated. In this manner, it is impossible to take up the entire excess movement of both trucks during the regulating movement of one. Furthermore, there will be no disturbance of the normal angularity of the opposite truck levers or of the main cylinder levers.

The present form of fulcrum 12, which is extensively used and comprises merely a pivot pin held in one of the holes 13 and secured by means of a cotter pin, is perhaps preferable to other forms of step by step regulators, such as pawl and ratchet mechanism, inasmuch as there is no danger of movement due to shocks and jars in the normal operation of the train.

In each application of the hand brake, it will normally maintain the piston at such effective length as to give approximately uniform piston travel, but whenever the piston travel exceeds the lost motion slot 20 a certain amount in excess of a desirable or permissible operative length, then it will be necessary to regulate the truck brake riggings. In order to do this, it is first necessary to release the holding dog 34 and move the telescoping piston rod 18 inwardly as far as possible with respect to the tubular part 16. On initial adjustment, the dead lever 7 is disconnected from its fulcrum and moved up one or more holes as may be necessary to take up all of the excess travel excepting that amount allowed by reason of the "drop back" which insures substantially proper brake shoe clearance. Then, on the first application of the hand brake, the brake shoes are applied, and if the necessary movement to apply the brakes exceeds the length of the lost motion slot 20, then the rod 18 is moved outwardly with respect to the telescoping portion 16 and held in its newly adjusted position by means of the holding device 34.

From the above, it will be seen that the present invention contemplates a simple and practical foundation brake rigging, together with regulating means associated with each truck whereby the approximate or substantially desired brake shoe clearance of either may be obtained without disturbing the relative angularity of the remaining levers of the system. It will be particularly noted that no added parts are needed to the present type of railway equipment now in use on a great many cars throughout the country, but only a rearrangement of such parts, whereby the supports for the cylinder levers or their equivalents are positioned in an accurate and predetermined manner with respect to the normal brake shoe clearance and the initial desired angularity of the cylinder and truck brake levers.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In foundation brake rigging for railway vehicles, in combination, truck brake levers, cylinder levers for actuating the same, stop means associated with one of said levers, and regulating means including a pin and hole connection associated with the truck levers for bringing the brake shoes carried by the truck levers into approximate proper brake shoe clearance distance without disturbing the angularity of the cylinder levers during the regulating operation.

2. In foundation brake rigging for railway vehicles, in combination, a cylinder lever, truck brake rigging connected therewith and adapted to be actuated thereby including live and dead levers, an adjustable support mounted on the truck frame for one lever whereby the brake shoes carried by said levers may be brought into approximate proper brake shoe clearance distance with respect to the wheels, and means associated with one lever adapted to prevent such regulating movement from disturbing the normal angularity of the cylinder lever during the regulating operation.

3. In foundation brake rigging for railway vehicles, in combination, a cylinder lever, truck brake rigging including live and dead levers connected therewith and a manually actuated regulator including a pin and hole device associated with the truck brake rigging whereby the shoes carried by said levers may be brought into approximate proper brake shoe clearance distance of the wheels, and stop means cooperating with the cylinder lever for maintaining its normal angularity and preventing the regulating movement of the truck brake levers from affecting its normal angularity during the regulating operation.

4. In foundation brake rigging for railway vehicles, in combination, a cylinder lever, truck brake rigging inclusive live and dead levers connected therewith and adapted to be actuated thereby, a manually actuated regulator mounted on the truck bolster and including a support having a plurality of holes in any one of which the dead truck lever may be mounted, whereby the shoes carried by said levers may be brought into approximate proper brake shoe clearance distance of the wheels, and stop means cooperating with the cylinder lever for maintaining normal angularity and preventing the regulating movement of the truck brake levers from affecting its normal angularity, and a hand brake mechanism connected with said cylinder lever whereby the brakes may be applied either by air or hand.

5. In foundation brake rigging for railway vehicles, in combination, an air brake cylinder and piston, a cylinder lever having a lost motion connection therewith, a hand brake adapted to move said cylinder lever without affecting the normal position of said air brake piston, a truck rigging connected with said air brake cylinder lever, a manually actuated regulator associated with the truck brake rigging, and means associated with the cylinder lever for maintaining its normal angularity and preventing the regulator from disturbing its angularity when the truck brake rigging is being regulated.

6. In foundation brake rigging for railway vehicles, in combination, an air brake cylinder having a telescopic piston, cylinder levers associated therewith, truck brake rigging at each end of the car, a hand brake mechanism having a lost motion connection with the piston whereby the brakes may be manually applied without disturbing said piston, manually actuated regulators associated with each truck for bringing the brake shoes into approximate proper brake shoe clearance distance, and means for preventing the regulating movement at either truck from disturbing the angularity of the cylinder levers or the levers of the other truck.

7. In foundation brake rigging for railway vehicles, in combination, an air brake cylinder having a telescopic piston, cylinder levers associated therewith, truck brake rigging at each end of the car, a hand brake mechanism having a lost motion connection with the piston whereby the brakes may be manually applied without disturbing said piston, manually actuated regulators associated with each truck for bringing the brake shoes into approximate proper brake shoe clearance distance, and means for preventing the regulating movement at either truck from disturbing the angularity of the cylinder levers or the levers of the other truck, said means including accurately positioned hangers for the cylinder levers adapted to prevent movement thereof during the regulating movement of the truck brake rigging.

8. In foundation brake rigging for railway vehicles, in combination, truck brake rigging including live and dead levers, manually actuated regulating means directly associated with the upper end of the dead lever and connecting the same with the truck for positioning the lever so as to bring the brake shoes into approximate proper brake shoe clearance distance, and means adapted to prevent relative movement of the upper end of the live lever during the manual actuation of said regulator.

9. In foundation brake rigging for railway vehicles, in combination, an airbrake cylinder having a piston, a cylinder lever having a lost motion connection with said piston whereby the lever may be actuated manually without effecting the normal position of said piston, truck brake rigging connected with the airbrake cylinder lever, a manually actuated regulator adapted to approximately position the brake shoes carried by the levers with respect to the truck wheels, and means adapted to prevent a disturbance of the normal angularity of the foundation brake rigging while the regulator is being actuated.

10. In combination with the brake rigging of a railway car including a pair of levers, manually actuated regulating means associated with said levers adapted to change their angularity and take up any existing excess travel, stop means cooperating with one lever for limiting the extent of regulating movement when said regulating means is actuated, said regulating means including a support and member engaged thereby, one of said parts having a plurality of holes whereby the other may cooperate with any desired hole in the first member.

11. In combination with the brake rigging of a railway car including a pair of levers, manually actuated regulating means associated with said levers adapted to change their angularity and take up any existing excess travel, stop means cooperating with said levers for limiting the extent of regulation when said regulating means is actuated, said regulating means including a pin and multiple hole construction whereby all of the travel may first be taken up on the multiple hole portion and then the other dropped back relatively one or more holes before finally connecting said parts thereby to insure approximate desired brake shoe clearance.

Signed at New York, New York, this 16th day of March, 1928.

W. H. SAUVAGE.